May 28, 1963  M. P. BAKER  3,091,486
BALL JOINT
Filed July 14, 1960

INVENTOR.
Max P. Baker
BY
His Attorney

United States Patent Office 3,091,486
Patented May 28, 1963

3,091,486
BALL JOINT
Max P. Baker, Dayton, Ohio, assignor to General Motors Corporation, Detroit, Mich., a corporation of Delaware
Filed July 14, 1960, Ser. No. 42,909
2 Claims. (Cl. 287—87)

This invention relates to a ball joint assembly and, particularly, to structure adapted for use in vehicle suspension mechanisms.

An object of this invention is to provide a new and improved ball joint means having a socket portion and stud including a semi-spherical head portion carrying a molded-on plastic resin laminate on one side of a laterally outwardly projecting flange on the opposite side of which there is provided an over-sized and slotted loose annular piece of a differing plastic resin adapted to act both as a bearing means and as an anti-backlash takeup spring.

A further object of this invention is to provide a vehicle ball joint means having a hollow socket portion and stud projecting therefrom as well as including a steel half ball portion covered with a molded-on fluorine containing resin layer immovable from the ball and a lower half bearing means of the completed ball formed from molded acetal resin having clearance from the stud around which it is journalled though having an outer diameter slightly greater than external diameter of the steel half ball whereby the bearing means is slightly over-size and is compressed by an interior periphery of the hollow socket portion for elimination of backlash.

Another object of this invention is to provide a vehicle ball joint means having a hollow socket portion and stud projecting therefrom as well as including in combination, a steel half ball portion covered with a molded-on polytetrafluoroethylene laminate immovable from the ball and a lower half bearing means of the completed ball formed from molded acetal resin having clearance from the stud around which it is loosely journalled as a result of lateral slotting though having an outer diameter slightly greater than external diameter of the steel half ball whereby the bearing means is slightly over-size and is pressed by an interior periphery of the hollow socket portion for elimination of backlash.

Further objects and advantages will be apparent from the following description, reference being had to the accompanying drawings wherein a preferred form of the present invention is clearly shown.

A ball joint assembly constructed in accordance with the present invention for use on motor vehicles having sprung and unsprung masses pivotally movable relative to each other provides features as to function and vehicle maintenance involving minimum effort so far as vehicle ownership and operation is concerned. Previous ball joint assemblies have included hard and brittle bearing components such as rings made of sintered metal. Impregnation of lubricant into space or pores in between sintered metal particles has proved difficult and costly to provide. Cracking or chipping of brittle parts often results in malfunction of ball joint assemblies requiring costly replacement. Due to a variety of road conditions encountered during vehicle use there is a need for a tough and wear resistant ball joint structure requiring a minimum of lubrication yet providing load bearing qualities as well as temperature and humidity stability to permit operation in wet and humid climates as well as in desert dry conditions and over rough or "washboard" or dirt roads. Many ball joint structures have incorporated metal spring parts adapted for resilient shock absorption. Due to fatigue and impact such metal springs and sintered metal bearing components ultimately fail under predetermined repeated cyclic stresses encountered as wheels of a vehicle together with an unsprung control arm or linkage move pivotally relative to a sprung mass or chassis from which the wheels are suspended and journalled. It is to be understood that under many ordinary operating conditions the use of sintered metal bearing materials is fully satisfactory. However under heavy duty conditions such brittle material has been found to be not as good as a thick annulus or bearing ring of acetal resin, a superpolyoxymethylene material.

Figure 2:
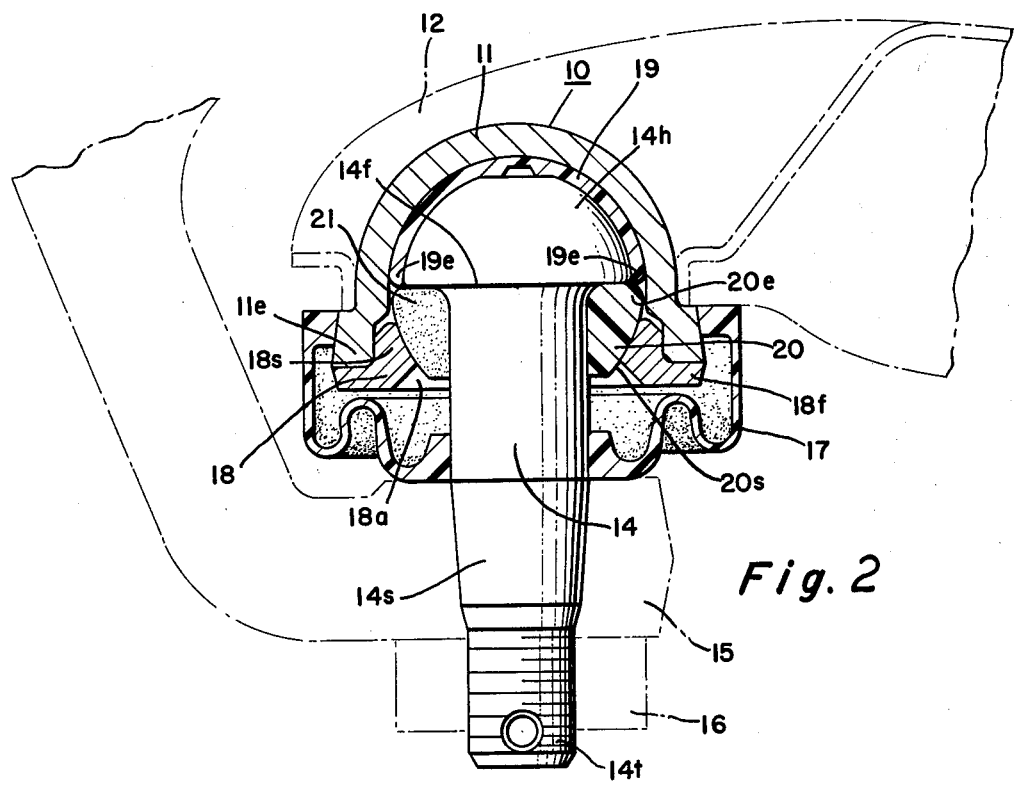
FIGURE 2 is a cross-sectioned elevational view taken along line 2—2 in FIGURE 1.
Figure 1:
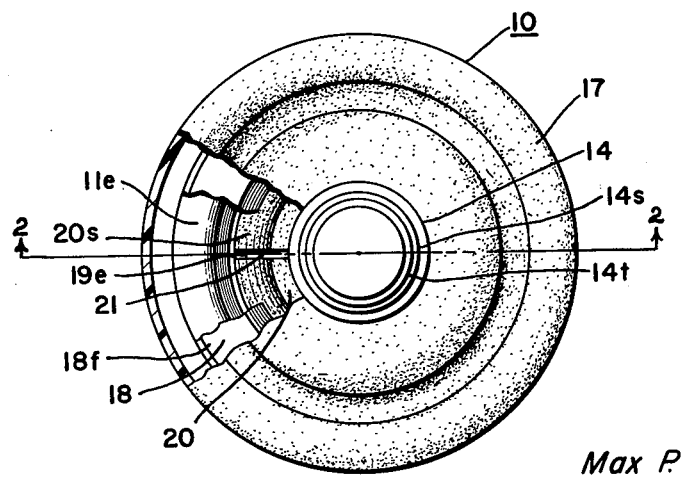
FIGURE 1 is a partially sectioned bottom view of a ball joint assembly of the present invention.

FIGURES 1 and 2 in the drawings show a ball joint assembly generally indicated by numeral 10 having structure in accordance with the present invention. The assembly includes a socket 11 having a substantially semi-spherical inner peripheral surface and adapted to be mounted in a fixed position adjacent to one end of a support member 12 indicated and outlined in FIGURE 2. In addition to the socket 11, the ball joint assembly includes a stud means 14 threaded at one end 14t and including a conically tapered shank portion 14s on which a link or arm 15 is held by a bolt or nut 16 as outlined in FIGURE 2. The arm 15 is journalled for pivotal movement as to member 12 by means of the ball joint assembly and particularly by movement of a head portion 14h peripherally inside the socket 11. A dirt seal or bellows-like cover means 17 made of rubber-like material such as neoprene, polyvinylchloride and the like is fitted to extend from a juncture of the apertured member 12 and outer peripheral edge of socket 11 to an intermediate portion of the stud means 14 on one side of the arm or link 15.

The ball joint assembly in accordance with the present invention further includes a metal retainer or ring member 18 having a laterally outwardly extending flanged portion 18f welded peripherally to an annular end 11e integral with the socket 11 and also engaged by the dirt seal 17 as noted earlier. The stud means 14 projects through an aperture 18a of retainer 18 that includes an integral partially spherical portion 18s.

Preferably the stud means 14 is made of steel and the head portion 14h has the shape of a half ball covered with a molded-on fluorine containing resin layer 19. Reference can be made to Patent No. 2,809,130, Rappaport, belonging to the assignee of the present invention for a disclosure concerning method of bonding a fluorinated synthetic resin to another material including metal. The layer 19 over the metal head portion 14h assures provision of a relatively low coefficient of friction as well as high chemical and thermal stability between complementary surfaces inside the socket 11 and externally along the layer 19. The term fluorine includes for example polytetrafluoroethylene, polytrifluoroethylene as well as polyfluorobutylacrylate resin materials. Polytetrafluoroethylene resin or Teflon (Du Pont) provides high temperature and chemical stability as well as resistance to the penetration of water and water vapor such as may be encountered in wet and humid climates where a motor vehicle may be operated. Another disclosure on specifically bonding polytetrafluoroethylene resins can be found in Patent No. 2,914,438, Sandt, assigned to Du Pont. The fluorine containing plastic resin of layer 19 provides a moldable non-metallic support and bearing surface of relatively high impact material.

Further in accordance with the present invention there is provided a bearing means 20 of relatively thick acetal resin material forming both a bearing surface 20s cooperable with either spherical portion 18s or both the spherical portion of the retainer or cover 18 as well as an inner peripheral surface of the socket 11. The bearing means 20 has a substantially annular or toroidal configuration except for a split or laterally outwardly extending slot 21 visible both in FIGURES 1 and 2. The acetal resin or superpolyoxymethylene thermoplastic material is commercially available as Delrin and has a combination of desirable properties advantageous for a ball joint assembly. Substantial lateral and radial thickness of the bearing means 20 made of acetal resin assures resilience all the way through and provides a wear-resistant bearing surface and structural part as a unitary element. Structurally the acetal resin bearing means 20 can be injection molded to have the split or slot 21 such that during assembly the bearing means 20 can be fitted loosely over the outer peripheral surface of the stud means 14. The split or lateral slot 21 makes the plastic resin bearing means 20 a washer-like component having an over-size diameter in comparison with the internal diameter of spherical portion 18s and an inner peripheral surface of the socket 11. This over-size feature of the acetal resin bearing means 20 is utilized in conjunction with the split or lateral slot 21 such that the bearing means 20 is compressed into an annular space adjacent to an annular flange portion 14f on one side of the head portion 14h. The acetal resin bearing means 20 is thus confined as a spring-like take-up or structural part used in combination with the ball joint assembly in accordance with the present invention. An annular end periphery 19e of the fluorine containing resin layer 19 terminates in a location adjacent to an upper and outer peripheral end 20e of the acetal resin bearing means 20. Frictional properties of the Delrin material are excellent and approach those of fluorocarbons. Acetal resin material used in bearing means 20 possesses unusually high tensile strength, rigidity and resistance to deformation and creep at elevated temperatures, particularly above 150° F. Delrin is one of the most solvent-resistant organic compounds known and is substantially unaffected by common solvents including petroleum products used for lubricating purposes. Delrin with a specific gravity of 1.42 is lighter in weight in comparison with magnesium die casting alloy with a specific gravity of 1.81, aluminum die casting alloy with a specific gravity of 2.65, brass casting alloy with a specific gravity of 8.5 and other metal alloys.

The acetal resin bearing means 20 used in combination with a ball joint assembly in accordance with the present invention requires a minimum of lubrication. A dab of chassis lubricating material can be applied to the entire bearing surfaces of the cooperating parts illustrated in FIGURE 2 before welding the retainer 18 to the edge of the socket 11.

It is to be understood that in place of welding the socket and retainer can have complementary flanges held together by suitable fastening means such as bolts and the like. The dirt seal 17 will shield the ball joint components against most foreign materials including dust and water which may be splashed from puddles along the road during movement of a vehicle over a surface which results in pivotal action of the head portion 14h together with the layer 19 and bearing means 20 complementary to the substantially spherical surface provided by the inner periphery of the socket 11 and spherical portion 18s of the metal retainer 18. The modulus of elasticity of Delrin is substantially stable at various moisture levels and temperatures. Delrin has outstanding resistance to creep particularly at temperatures of 150° F. and higher. Other plastic materials such as nylon or polyamide resins would deform and fail under repeated cyclic stress due to road shock transmitted by way of vehicle wheels to a ball joint assembly.

Delrin has an unusually high fatigue endurance when subjected to a repeated cyclical load. Even at temperatures of 150° F. and 100% relative humidity, Delrin still retains a high fatigue endurance limit. In fact, the presence of water as well as oil has almost no effect on the fatigue life involving friction, but rather both water and oil serve as lubricants for this tough, resilient material which is much like spring steel deformable temporarily under force only to recover almost perfectly to its original condition. Delrin has an impact resistance (1.2) at −40° F. which is only slightly less than its impact resistance (1.4) at room temperature. These impact values are given as an indication of toughness for high and low temperature conditions in combination with both abrasion resistance and low coefficient of friction having the unusual property of being substantially the same value for both static and dynamic coefficients of friction. Even when dry, the acetal resin bearing means 20 can bear and rub against steel without squeaking which is a problem with other plastic bearing materials such as phenolic. Presence of any lubricant including oil or water for this combination improves bearing characteristics though only minimum water absorption is encountered. Rate of water absorption is governed not only by temperature and moisture environment but also by thickness of the part involved such that equilibrium of water content for thicker pieces is not attained for a longer period of time. The bearing means 20 of acetal resin has a substantially thick cross section such that dimensional change due to humidity or moisture conditions is relatively negligible. Use of the acetal resin bearing means 20 in combination with a ball joint assembly shows no significant decrease in physical properties upon prolonged exposure to air in continuous service at temperatures up to 180° F. or in intermittent service at temperatures up to 250° F. Even under wet conditions and continuous exposure to temperatures up to 150° F. there is no significant reduction in physical properties and advantages to be gained by provision of bearing means 20 of acetal resin in accordance with the present invention.

The bearing means 20 of acetal resin as compressed between stud means 14, retainer 18 as well as socket 11 and the like is adapted to act both as a bearing means and as an anti-backlash take-up spring when assembled in a ball joint structure as illustrated in the drawings. When the ball joint assembly using acetal resin bearing means in accordance with the present invention is fitted to front end suspension control arm structures on a motor vehicle, there is appreciably easier steering and turning of wheels due to the favorable frictional characteristics of the acetal resin bearing surfaces with respect to the socket 11, spherical portion 18s, flange 14f and stud means 14. The molded-on Teflon laminate is immovable from the half ball portion of the head 14h and the split or slotted acetal resin bearing means 20 slightly over-sized to be under compression after assembly virtually eliminates backlash encountered after vehicle wheels have been subjected to a sudden shock such that the stud means 14 are subjected to a sudden force radially in one direction laterally outwardly from the hollow interior of socket 11. The structure of the present invention eliminates necessity for metallic spring take-ups and the like.

While the embodiments of the present invention as herein disclosed constitute a preferred form, it is to be understood that other forms might be adopted.

What is claim is as follows:

1. In a ball joint assembly necessarily having a curved head with a lateral flange adjacent to integral stud means and a partially spherical socket complementary thereto as fitted with a rigid semi-spherical polyeterafluoroethylene plastic-resin low-friction laminate means located radially and directly intermediate only the curved head and the socket as well as having an annular cover attached directly only to the socket to provide an annular space therewith adjacent to the stud means in a location remote from said polytetrafluoroethylene plastic-resin low-friction laminate means, the combination therewith of an acetal resin bearing member substantially annular though decidedly oversized in shape fitted against the lateral flange of the curved head, said bearing member structurally having a lateral slot completely to split the annular shape thereof and to permit compression thereof radially as well as axially in the annular space though in resilient engagement directly only between said cover as well as said flange and stud means simultaneously to provide a low friction bearing surface impact and shatter resistant for easy turning contiguously complementary with said rigid polytetrafluoroethylene plastic-resin low-friction laminate means as well as to provide spring-like resilience as a backlash take-up for sudden force transmissible axially of said stud means, said split annular bearing member of acetal resin having substantial dimensional stability over a range in temperature between −40° F. and 250° F. irrespective of moisture conditions to complement said polytetrafluoroethylene plastic-resin low-friction laminate means in combination therewith.

2. In a ball joint assembly necessarily having a curved head with an integral stud means as well as with a laterally-outwardly extending flange located a predetermined distance inwardly from a partially spherical socket having an annular cover attached directly thereto with an annular spacing from adjacent stud means, in combination therewith improvement which comprises both a rigid semispherical polytetrafluoroethylene plastic-resin low-friction laminate means located directly only between the socket and curved head, and an acetal resin bearing member substantially annular though decidedly oversized in shape confined directly in annular spacing between the cover and stud means as well as the lateral flange of the curved head, said acetal resin bearing member structurally having a lateral slot completely to split the annular shape radially thereof and to permit inward and axial compression thereof in the annular spacing though in resilient engagement directly only between said annular cover as well as said lateral flange and stud means simultaneously to have said rigid semi-spherical polytetrafluoroethylene plastic-resin laminate means as a low-friction bearing surface impact and shatter resistant for easy turning contiguously complementary with spring-like resilience as a backlash take-up for sudden force transmissible axially of said stud means, said split annular bearing member of acetal resin having substantial dimensional stability over a range in temperature extending from well below freezing such as −40° F. to continuous hot conditions of service at temperatures up to 180° F. as well as intermittent service at temperatures up to 250° F. irrespective of moisture conditions to complement said polytetrafluoroethylene plastic-resin low-friction laminate means in combination therewith.

References Cited in the file of this patent

UNITED STATES PATENTS

| | | |
|---|---|---|
| 1,775,525 | Hedlund | Sept. 9, 1930 |
| 2,873,130 | Moskovitz | Feb. 10, 1959 |
| 2,879,091 | Baker | Mar. 24, 1959 |
| 2,913,268 | Booth | Nov. 17, 1959 |

OTHER REFERENCES

The publication "Delrin acetal resin," published June 1957, by polychemicals department of E. I. du Pont de Nemours and Co. (Inc.), Wilmington 98, Delaware.